US012331546B2

(12) United States Patent
Schlack

(10) Patent No.: US 12,331,546 B2
(45) Date of Patent: Jun. 17, 2025

(54) MODULAR LATCH SYSTEM

(71) Applicant: Southco, Inc., Concordville, PA (US)

(72) Inventor: Richard E. Schlack, Concordville, PA (US)

(73) Assignee: Southco, Inc., Concordville, PA (US)

( * ) Notice: Subject to any disclaimer, the term of this patent is extended or adjusted under 35 U.S.C. 154(b) by 180 days.

(21) Appl. No.: 17/794,382

(22) PCT Filed: Jan. 26, 2021

(86) PCT No.: PCT/US2021/014985
§ 371 (c)(1),
(2) Date: Jul. 21, 2022

(87) PCT Pub. No.: WO2021/154670
PCT Pub. Date: Aug. 5, 2021

(65) Prior Publication Data

US 2023/0048007 A1 Feb. 16, 2023

Related U.S. Application Data

(60) Provisional application No. 63/084,205, filed on Sep. 28, 2020, provisional application No. 62/968,464, filed on Jan. 31, 2020.

(51) Int. Cl.
*E05B 17/00* (2006.01)
*E05B 13/10* (2006.01)
(Continued)

(52) U.S. Cl.
CPC ........ *E05B 17/0025* (2013.01); *E05B 13/106* (2013.01); *E05B 17/142* (2013.01);
(Continued)

(58) Field of Classification Search
CPC .... E05B 17/0025; E05B 17/142; E05B 17/04; E05B 13/106; E05B 13/02;
(Continued)

(56) References Cited

U.S. PATENT DOCUMENTS 2,860,904 A * 11/1958 Barry .................... E05B 65/006 292/206
3,302,964 A * 2/1967 Barry ........................ E05C 3/04 292/57
(Continued)

FOREIGN PATENT DOCUMENTS

CN 110036166 A 7/2019
CN 110114543 A 8/2019
(Continued)

OTHER PUBLICATIONS

International Preliminary Report on Patentability and Written Opinion for International Application No. PCT/US2021/014985, issued Jul. 28, 2022, 10 pages.

(Continued)

*Primary Examiner* — Kristina R Fulton
*Assistant Examiner* — Steven A Tullia
(74) *Attorney, Agent, or Firm* — Buchanan Ingersoll & Rooney PC

(57) ABSTRACT

A compression latch for a door includes a driver that is rotatable with respect to the door between an unlocked position and a locked position. The driver is configured to be mounted to one side of the door. A driver shaft is non-rotatably connected to the driver such that the driver shaft rotates along with the driver. In an unlocked position of the driver, the pawl is positioned to permit opening of the door, and, in a locked position of the driver, the pawl is positioned to prevent opening of the door. The compression latch is configured to translate the pawl closer toward the door upon rotating the driver from the unlocked position to the locked position.

17 Claims, 16 Drawing Sheets

(51) Int. Cl.

| | |
|---|---|
| ***E05B 15/10*** | (2006.01) |
| ***E05B 17/14*** | (2006.01) |
| ***E05C 3/04*** | (2006.01) |
| ***E05C 5/04*** | (2006.01) |
| ***E05C 9/02*** | (2006.01) |
| ***E05C 9/18*** | (2006.01) |

(52) U.S. Cl.
CPC ................ *E05C 3/042* (2013.01); *E05C 5/04* (2013.01); *E05C 9/02* (2013.01); *E05C 9/1841* (2013.01); *E05C 9/1875* (2013.01); *E05B 2015/107* (2013.01)

(58) Field of Classification Search
CPC ...... E05B 2015/107; E05C 3/042; E05C 5/04; E05C 5/00; E05C 5/02; E05C 9/02; E05C 9/1841; E05C 9/1875; Y10T 292/1077
See application file for complete search history.

(56) References Cited

U.S. PATENT DOCUMENTS

| | | | | |
|---|---|---|---|---|
| 3,402,958 | A * | 9/1968 | Barry | E05C 3/042 292/62 |
| 4,556,244 | A * | 12/1985 | Bisbing | E05B 17/0025 292/336.3 |
| 4,763,935 | A * | 8/1988 | Bisbing | E05B 17/0025 292/DIG. 60 |
| 5,087,088 | A * | 2/1992 | Milam | E05C 5/00 292/110 |
| 7,441,812 | B2 | 10/2008 | Welsh et al. | |
| 7,454,933 | B1 * | 11/2008 | Paige | E05B 5/003 292/DIG. 31 |
| 9,739,074 | B1 * | 8/2017 | Lane | E05B 83/02 |
| 12,054,964 | B1 * | 8/2024 | Weinerman | E05B 15/0053 |
| 2011/0304161 | A1 | 12/2011 | Behjat et al. | |
| 2019/0338569 | A1 | 11/2019 | Manly et al. | |

FOREIGN PATENT DOCUMENTS

| | | | |
|---|---|---|---|
| DE | 19814297 | A1 | 10/1999 |
| DE | 202007013514 | U1 | 12/2007 |
| WO | 2008138416 | A1 | 11/2008 |

OTHER PUBLICATIONS

International Search Report and Written Opinion for International Application No. PCT/US2021/014985, dated Jun. 1, 2021, 13 pages.
Office Action (The First Office Action) issued Jan. 16, 2025, by the State Intellectual Property Office of People's Republic of China in corresponding Chinese Patent Application No. 202180011855.2 and an English translation of the Office Action. (20 pages).

* cited by examiner

MODULAR LATCH SYSTEM

CROSS-REFERENCE TO RELATED APPLICATIONS

This application is a U.S. National Phase Patent Application of PCT Patent Application No. PCT/US2021/014985, filed Jan. 26, 2021, which claims priority to U.S. Provisional Patent Application No. 62/968,464, filed on Jan. 31, 2020, and U.S. Provisional Patent Application No. 63/084,205, both titled "MODULAR LATCH SYSTEM," the entirety of each of which is incorporated by reference herein.

FIELD OF THE INVENTION

The present invention relates to the field of mechanical latches.

BACKGROUND OF THE INVENTION

As is described in U.S. Pat. No. 7,441,812 to Southco, Inc., compression latches for mounting on doors or panels are known. Compression latches are used in applications in which it is desirable to both latch a door or panel to the frame in which it is mounted and to seal the edge of the panel to the frame when closed. For example, compression latches are desirable when the opening in which the panel is mounted is provided with a gasket that must be compressed to provide a seal. Compression latches may be used on doors for heating, ventilation and air conditioning (HVAC) units, for example. HVAC unit doors, which are typically thick and filled with insulation, can have wide thickness tolerances. It would be desirable to provide a modular compression latch that compensates for the thickness tolerance.

SUMMARY OF THE INVENTION

According to a first aspect of the present invention, a compression latch for a door is provided. The latch includes a driver that is rotatable with respect to the door between an unlocked position and a locked position. The driver is configured to be mounted to one side of the door. A driver shaft is non-rotatably connected to the driver such that the driver shaft rotates along with the driver. A pawl assembly comprises (i) a housing that is configured to be fixedly mounted to the door, and (ii) a pawl that is movably connected to the housing and is configured to both rotate and translate with respect to the housing in response to rotation of the driver shaft. In an unlocked position of the driver, the pawl is positioned to permit opening of the door, and, in a locked position of the driver, the pawl is positioned to prevent opening of the door. The compression latch is configured to translate the pawl closer toward the door upon rotating the driver from the unlocked position to the locked position.

According to another aspect of the present invention, a pawl assembly for locking a door is provided. The pawl assembly comprises a housing that is configured to be fixedly mounted to the door, and a pawl that is movably connected to the housing and is configured to both rotate and translate with respect to the housing. In an unlocked position of the pawl assembly, the pawl is positioned to permit opening of the door, and, in a locked position of the driver, the pawl is positioned to prevent opening of the door. The pawl is configured to move closer to the door upon moving the pawl assembly from the unlocked position to the locked position.

According to still another aspect of the present invention, a driver is configured to be rotatably mounted to a door. The driver defines a handle that is capable of being grasped by a user. An opening is formed in the driver. A fastener is positioned within the opening for mounting the driver to the door. A cover is removably mounted to the driver and is positioned over the opening to conceal a head of the fastener, the cover defining a relief in the form of an undercut on a surface thereof. A lock plug is rotatably mounted to the driver between an unlocked state and a locked state, wherein in the unlocked state of the lock plug, the driver can be rotated with respect to the door, and in the locked state of the lock plug, the driver is prevented from rotating with respect to the door. A projection extends from the lock plug, the projection being non-rotatable with respect to the lock plug. In a locked state of the lock plug, the projection is positioned within the relief to prevent removal of the cover from the driver and consequent access to the fastener, and in an unlocked state of the lock plug, the projection is not positioned within the relief to permit removal of the cover from the driver and allow consequent access to the fastener.

BRIEF DESCRIPTION OF THE DRAWINGS

The above and other aspects and features of the present invention will become more apparent to those of ordinary skill in the art by describing in detail exemplary embodiments thereof with reference to the attached drawings.

More particularly, FIGS. 14B and 14C are partial side-elevation views of the driver of FIG. 14A shown in an unlocked state. FIGS. 14D and 14E are cross-sectional views of the driver of FIGS. 14B and 14C taken along the lines 14D-14D and 14E-14E, respectively. FIG. 14F is a detailed view of FIG. 14E.

FIGS. 14G and 14H are partial side-elevation views of the driver of FIG. 14A shown in a locked state. FIGS. 14I and 14J are cross-sectional views of the driver of FIGS. 14G and 14H taken along the lines 14I-14I and 14J-14J, respectively. FIG. 14K is a detailed view of FIG. 14J.

DETAILED DESCRIPTION OF THE INVENTION

Figure 1B:
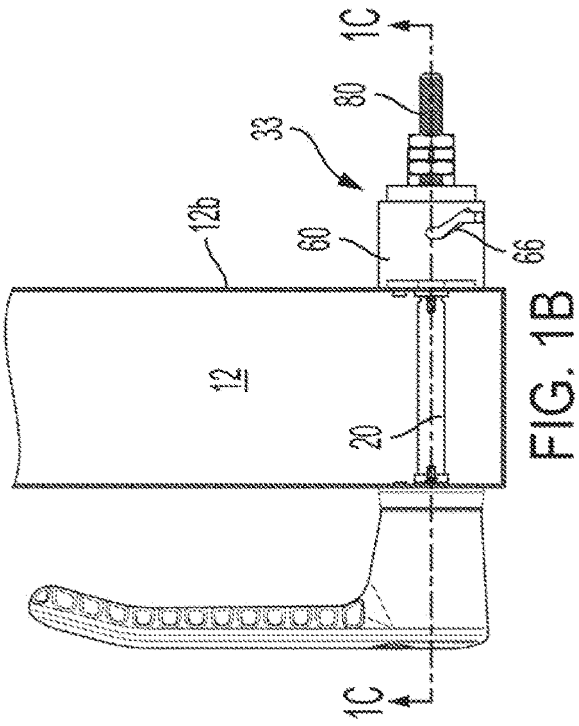
FIGS. 1A-1C depict isometric, top plan and cross-sectional views, respectively, of a compression latch assembly (latch, hereinafter) that is mounted to the door, wherein the latch is shown rotated to an unlocked state.

Although the invention is illustrated and described herein with reference to specific embodiments, the invention is not intended to be limited to the details shown. Rather, various modifications may be made in the details within the scope and range of equivalents of the claims and without departing from the invention.

Various terms are used throughout the disclosure to describe the physical shape or arrangement of features. A number of these terms are used to describe features that conform to a cylindrical or generally cylindrical geometry characterized by a radius and a center axis perpendicular to the radius. Unless a different meaning is specified, the terms are given the following meanings. The terms “longitudinal”, “longitudinally”, “axial” and “axially” refer to a direction, dimension or orientation that is parallel to a center axis. The terms “radial” and “radially” refer to a direction, dimension or orientation that is perpendicular to the center axis. The terms “inward” and “inwardly” refer to a direction, dimension or orientation that extends in a radial direction toward the center axis. The terms “outward” and “outwardly” refer to a direction, dimension or orientation that extends in a radial direction away from the center axis.

In the description, relative terms such as “horizontal,” “vertical,” “up,” “down,” “top” and “bottom” as well as derivatives thereof (e.g., “horizontally,” “downwardly,” “upwardly,” etc.) should be construed to refer to the orientation as then described or as shown in the drawing figure under discussion. These relative terms are for convenience of description and normally are not intended to require a particular orientation.

Terms concerning attachments, coupling and the like, such as “mounted,” “connected” and “interconnected,” refer to a relationship wherein structures are secured or attached to one another either directly or indirectly through intervening structures, as well as both movable or rigid attachments or relationships, unless expressly described otherwise.

The terms “proximal” and “distal” are herein used throughout this disclosure as relative terms. In the context of describing the latch, the term “proximal,” such as in the phrase “proximal end”, is herein intended to mean toward or closer to a driver 14 of the latch, whereas the term “distal,” such as in the phrase “distal end” is herein intended to mean away from or further away from driver 14 of the latch.

Figure 1C:
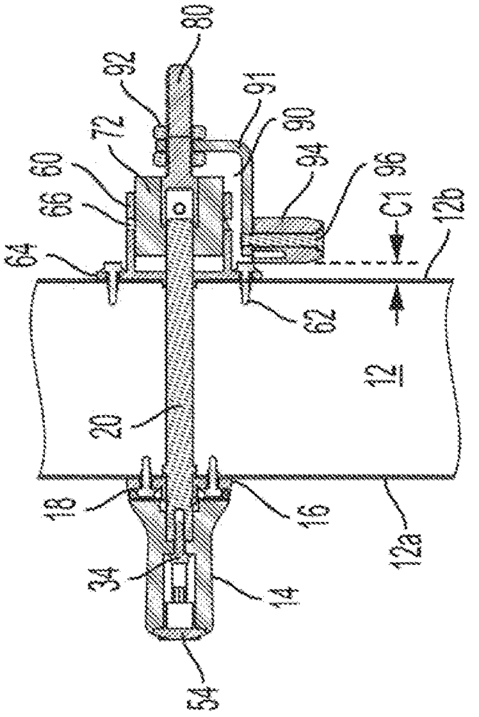
Figure 1A:
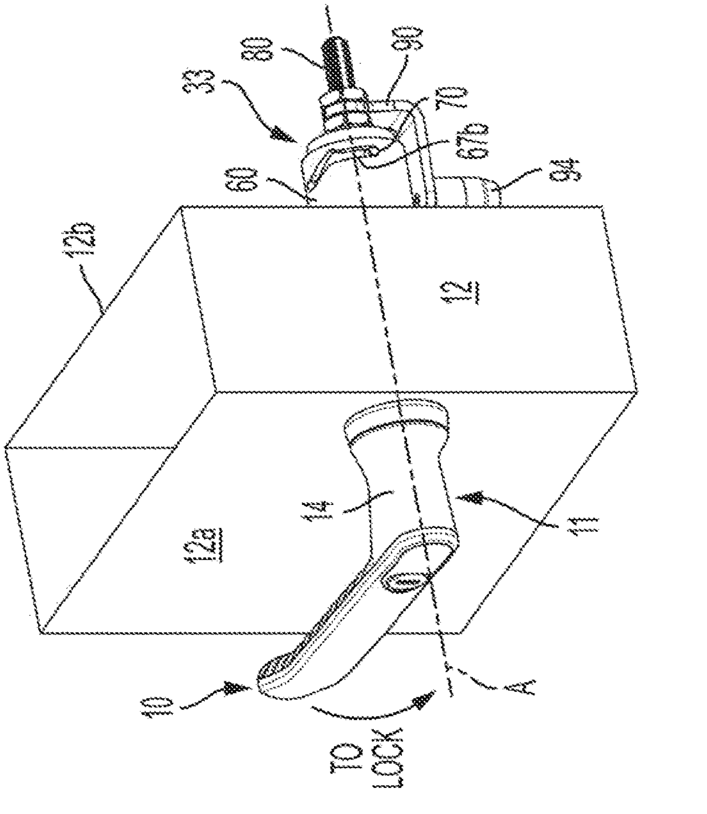

FIGS. 1A-4 depict a compression latch assembly 10 (latch 10, hereinafter) that is mounted to a door 12. FIGS. 1A-1C depict the latch 10 in an unlocked state, FIGS. 2A-2C depict the latch 10 in a partially locked state, and FIGS. 3A-3C depict the latch 10 in a locked and compressed state.

Latch 10 generally comprises a driver sub-assembly 11 that is connected to a pawl sub-assembly 33 for maintaining a door 12 in either locked or unlocked state with respect to a frame to which door 12 is movably mounted. Door 12 includes a front side 12*a*, a rear side 12*b*, and a hollow area positioned between those sides, which may be filled with foam, for example. Door 12 may vary from that which is shown and described.

Referring now the features of driver sub-assembly 11, driver sub-assembly 11 generally comprises a driver 14 that is (i) rotatably mounted to a cylindrical bezel 16 about longitudinal axis A, and (ii) non-rotatably connected to a driver shaft 20.

Driver 14 is shown in FIGS. 6A-6H. Driver 14 is an L-shaped member that includes an elongated portion having a gripping surface 13 for grasping by an end user. Driver 14 is rotatably mounted to bezel 16 about longitudinal axis A, however, it should be understood that driver 14 is prevented from translating along axis. Driver 14 may be provided in the form of a handle, a knob, a lever, a ‘T’, or a tool driver, for example.

A lock plug 40 is mounted within an opening on the front face of driver 14. Lock plug 40, which has a recess for receiving a key or other tool, is configured to selectively permit rotation of driver 14, as is known in the art. Lock plug 40 is an optional component of driver 14.

Figure 4:
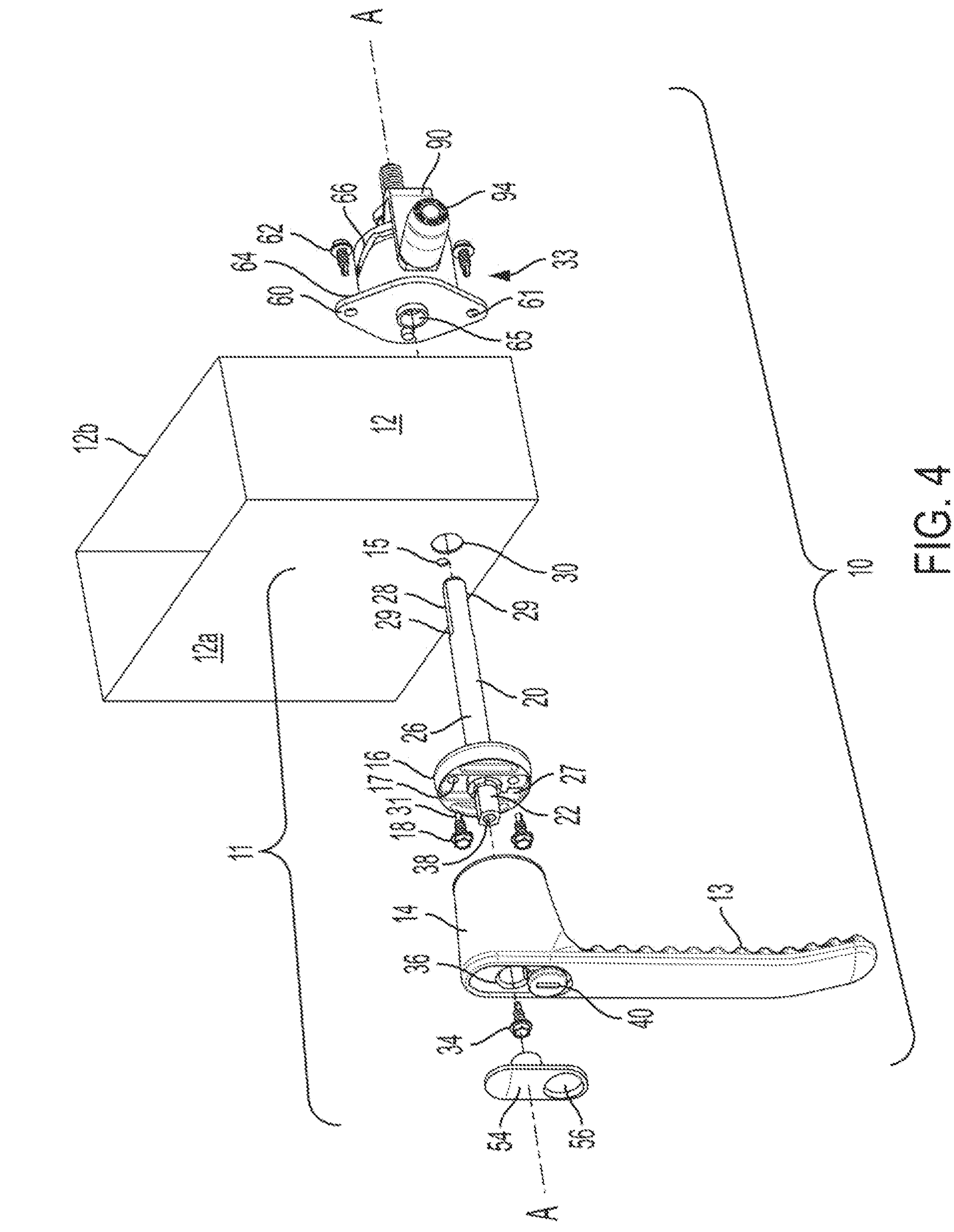
FIG. 4 is an exploded view of the latch of FIG. 1A.
Figure 6A:
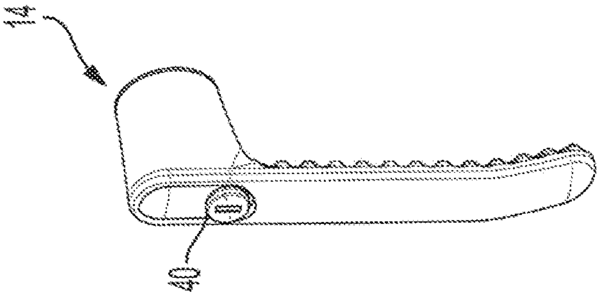
FIGS. 6A-6H are isometric, rear elevation, right side elevation, front elevation, left side elevation, bottom plan, top plan and enlarged cross-sectional views, respectively, of a driver of the latch of FIG. 1A.
Figure 6B:
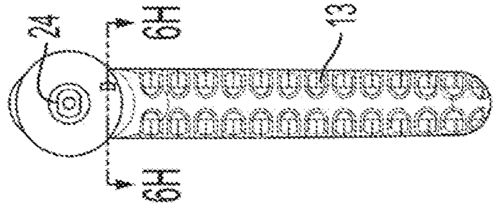
Figure 6C:
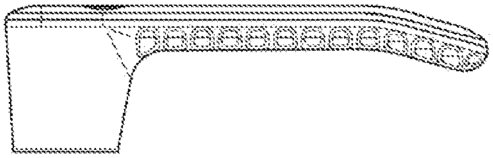
Figure 6D:
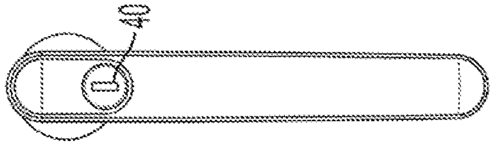
Figure 6E:
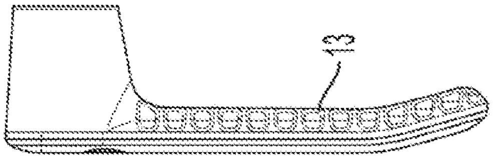
Figure 6F:
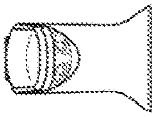
Figure 6G:
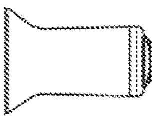
Figure 6H:
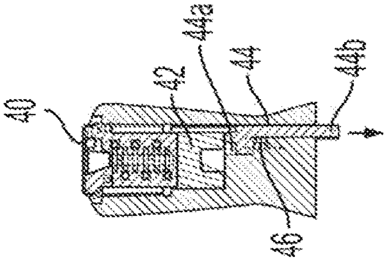
Figure 7A:
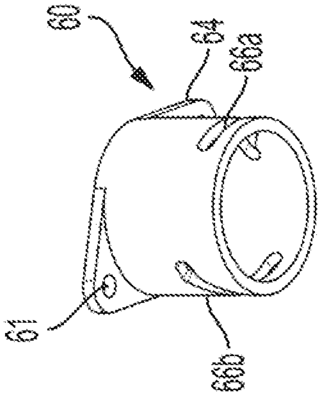
FIGS. 7A-7E are isometric, bottom plan, side elevation, top plan and front elevation views, respectively, of a housing of the pawl sub-assembly of FIG. 5.
Figure 7B:
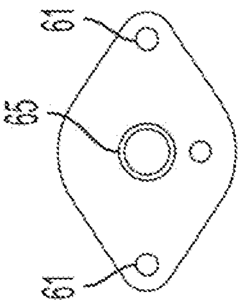
Figure 7C:
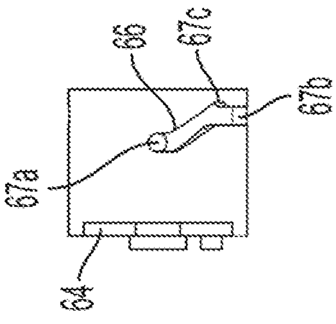
Figure 7D:
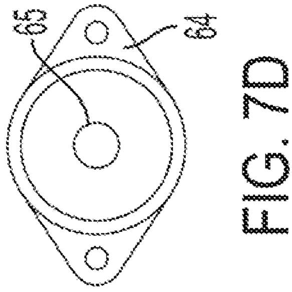
Figure 7E:
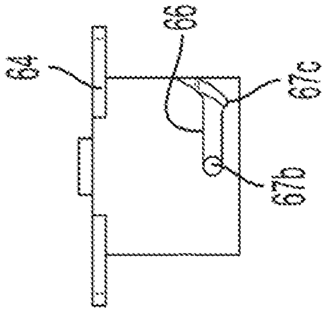
Figure 8D:
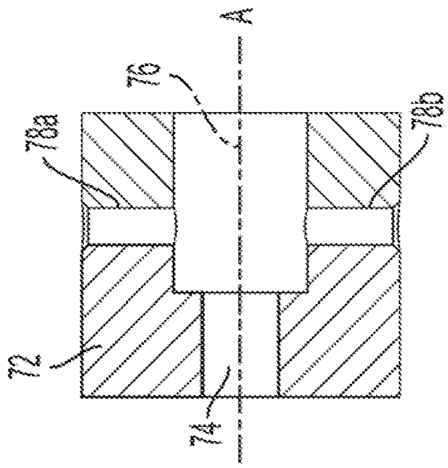
FIGS. 8A-8D are isometric, side elevation, bottom plan, and cross-sectional views, respectively, of a sleeve of the pawl sub-assembly of FIG. 5.
Figure 8B:
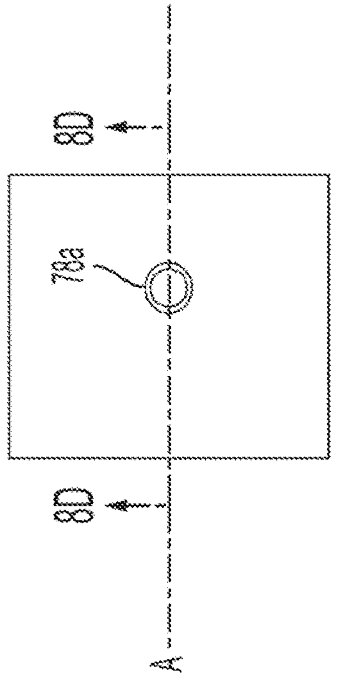
Figure 8C:
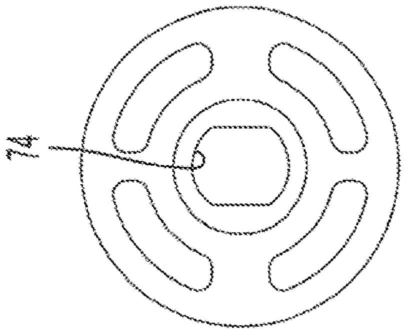
Figure 8A:
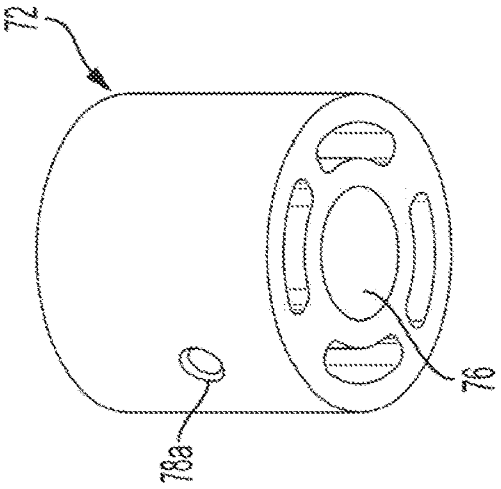
Figure 9C:
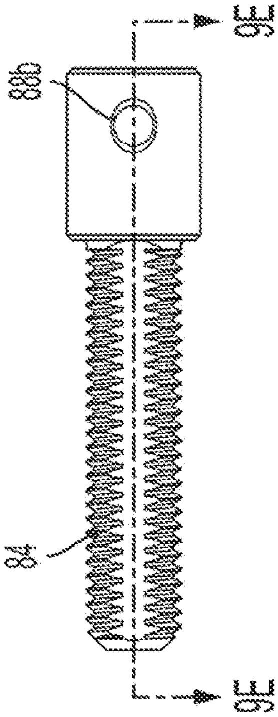
FIGS. 9A-9E are isometric, front elevation, side elevation, top plan, and cross-sectional views, respectively, of a threaded shaft of the pawl sub-assembly of FIG. 5.
Figure 9E:
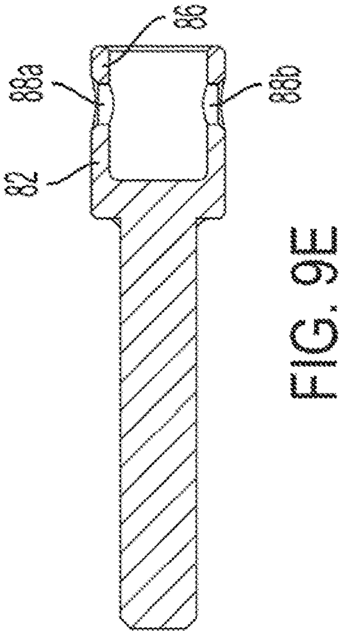
Figure 9B:
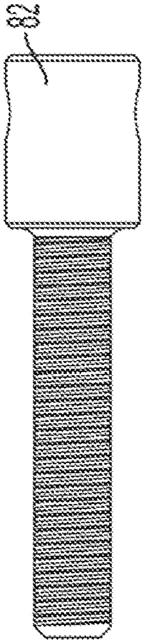
Figure 9D:
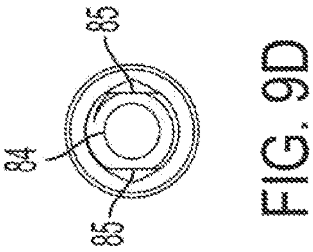
Figure 9A:
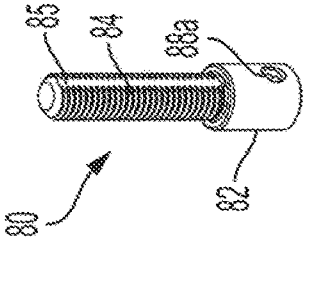
Figure 10A:
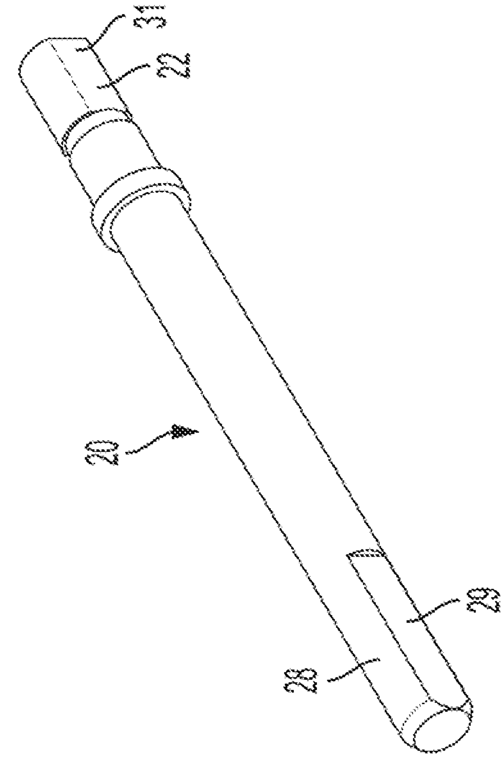
FIGS. 10A-10E are isometric, right elevation, left elevation, front elevation, and rear elevation views, respectively, of a driver shaft of the latch of FIG. 1A.
Figure 10B:
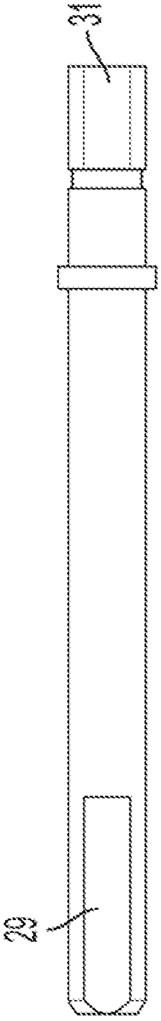
Figure 10C:
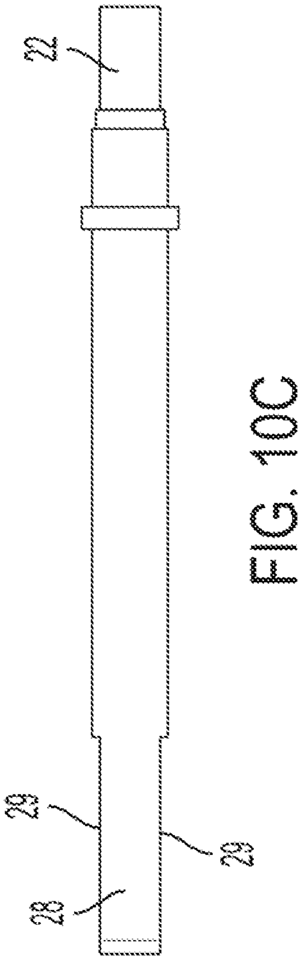
Figure 10D:
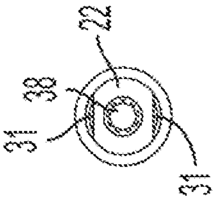
Figure 10E:
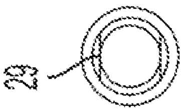
Figure 11E:
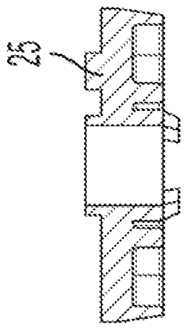
FIGS. 11A-11E are isometric, front elevation, side elevation, rear elevation, and cross-sectional views, respectively, of a bezel of the latch of FIG. 1A.
Figure 11C:
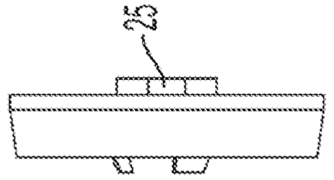
Figure 11D:
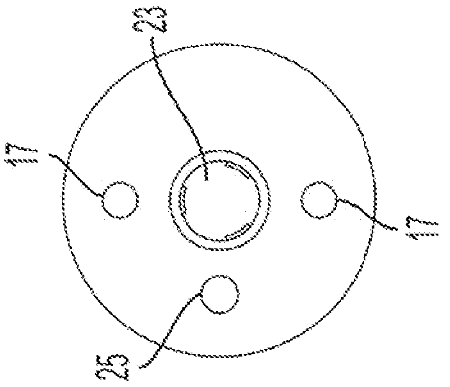
Figure 11A:
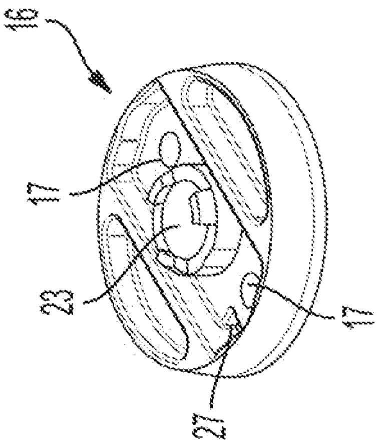
Figure 11B:
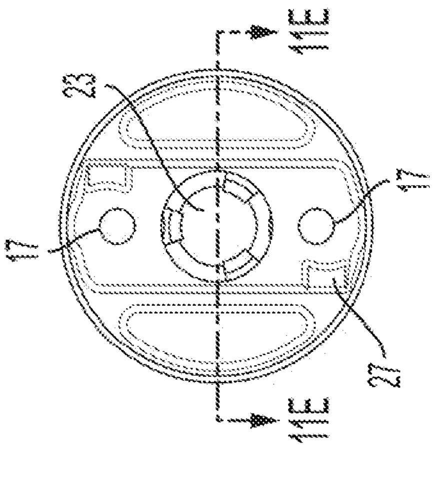

In a locked configuration of lock plug 40, rotation of driver 14 is not possible. And, in an unlocked configuration of lock plug 40, rotation of driver 14 is possible. More particularly, as shown in FIGS. 6H and 4, when the proper key is inserted into the lock plug 40, the user can rotate the lock plug 40. A cam or ramp 42 on the underside of the lock plug 40 rotates therewith and interacts with a post 44 that is loaded by a spring 46. Post 44 is translatably positioned with a recess 48 formed in the underside of driver 14.

In the locked position of lock plug 40 (shown in FIG. 6H), a bearing surface of ramp 42 bears on the proximal end 44*a* of post 44 and moves post 44 in the direction shown by the arrow in FIG. 6H against the bias of spring 46. And, the distal end 44*b* of post 44 is positioned within opening 27 (FIG. 4) of stationary bezel 16. When distal end 44*b* of post 44 is positioned within opening 27 of stationary bezel 16 it is not possible is to rotate driver with respect to bezel 16.

In the unlocked position of lock plug 40 (not shown), an opening in ramp 42 is rotationally aligned with post 44 such that ramp 42 does not bear on the proximal end 44*a* of post 44. Thus, spring 46 is permitted to move post 44 in an upward direction such that distal end 44*b* of post 44 does not protrude from the lower side of driver 14. Accordingly, post 44 is not positioned within opening 27 of stationary bezel 16. When distal end 44*b* of post 44 is not positioned within opening 27 of stationary bezel 16 it is possible to rotate driver with respect to bezel 16 (as well as door 12).

A cover 54 is mounted to the front face of driver 14 to conceal the head of fastener 34 in an effort to prevent unauthorized removal of the fastener 34. Cover 54 includes an opening 56 to provide access to the front face of lock plug 40. As will be described with reference to FIGS. 14A-14K, the lock plug 40 and cover 54 are specially configured to prevent removal of the cover 54, as well as the underlying fastener 34, in a locked state of the lock plug 40. In an unlocked state of the lock plug 40, the cover 54, as well as the underlying fastener 34, may be removed/disassembled from the driver 14.

Turning now to FIGS. 14A-14K, the cover 54 includes a protrusion 55 on its interior facing surface that is positioned to extend through the opening 36 in the driver 14. A relief 57 is formed in the bottom side of the protrusion 55. The relief 57 may also be referred to herein as a cutout, gap, slot, opening, surface or recess.

A cam lock 41 is non-rotatably mounted to the body of the lock plug 40 such that the cam lock 41 rotates along with the lock plug 40. The cam lock 41 is situated behind a shoulder formed on the front face of the lock plug 40 such that, in an assembled configuration of the driver 14, the cam lock 41 is not visible to an end user. The cam-lock 41 is (optionally) a metallic member having a uniform thickness (as viewed in FIG. 14E), a tear drop shaped perimeter (more generally, non-circular perimeter), and an opening formed in the center of the tear drop shape through which the lock plug 40 is mounted. The rounded perimeter portion of the tear drop shaped perimeter extends further from the axis of rotation of the cam lock 41 than does the flat perimeter portion 41*a* of the tear drop shaped perimeter.

In operation of the lock plug 40, the cam lock 41 is positioned to selectively enter the relief 57 of the cover 54. More particularly, in a locked state of the lock plug 40 shown in FIGS. 14G-14K, the lock plug 40 is rotated to a position such that the cam lock 41 is positioned within the relief 57. In particular, in the locked state, the rounded perimeter portion of the tear drop shaped perimeter is positioned within the relief 57. And, in an unlocked state of the lock plug 40 shown in FIGS. 14B-14F, the lock plug 40 is rotated to a position such that the cam lock 41 is not positioned within the relief 57. In particular, in the unlocked state, the flat perimeter portion 41*a* of the tear drop shaped perimeter is rotationally aligned with but radially spaced apart and separated from the relief 57.

In the locked state of the lock plug 40, it is not possible to remove the cover 54 (and access the fastener 34) because the cover 54 is captivated to the driver 14 by the cam lock 41. And, in the unlocked state of the lock plug 40, it is possible to remove the cover 54 (and access the fastener 34) because the cover 54 is not captivated to the driver 14 by the cam lock 41.

Those skilled in the art will recognize that the cam lock 41 is not limited to that which is shown in the figures. For example, the cam lock 41 may be a protrusion that projects radially from the lock plug 40 for selectively interacting with the relief 57. The cam lock 41 may be referred to herein as a projection. The projection may be either integral with or separate from the lock plug 40.

Bezel 16 is shown in FIGS. 11A-11E. Bezel 16 is fixedly mounted to a front side 12*a* of door 12 by two self-tapping fasteners 18 that are capable of piercing door 12. Each fastener 18 is positioned through a respective hole 17 formed in bezel 16. It should be understood that fasteners 18 as well as any holes for receiving fasteners 18 can vary, as is known in the art. An alignment projection 25 FIGS. 11E and 11D) on the underside of bezel 16 engages with a hole 15 in door 12 to key the rotational position of bezel 16 on door 12 and also prevent rotation of bezel 16 as driver 14 moves between the locked and unlocked states. Opening 27 is formed on the front face of bezel 16 and is configured to interact with a driver locking feature, as was described above.

Driver shaft 20 is rotatably mounted to bezel 16 and is non-rotatably mounted to driver 14. Driver shaft 20 is also shown in FIGS. 10A-10E. The term "non-rotatable" means, for example, that driver shaft 20 is not rotatable with respect to driver 14, however, driver 14 and driver shaft 20 can simultaneously rotate in the same direction. A non-circular head portion 22 (i.e., having opposing flat portions 31) is provided at the proximal end of the driver shaft 20. Head portion 22 is non-rotatably positioned within a non-circular recess 24 (FIG. 6B) formed in the rear side of driver 14. A cylindrical shaft portion 26 of driver shaft 20 is rotatably positioned within a central hole 23 (FIG. 11B) of bezel 16 such that driver shaft 20 can rotate within bezel 16. The non-circular connector 28 at the distal end of driver shaft 20 is configured to pass through an opening 30 in door 12 and engage with the pawl subassembly 33, as will be explained in greater detail with respect to pawl subassembly 33. The non-circular connector 28 of driver shaft 20 is cylindrical and has two flat portions 29, as viewed in cross-section, for keying driver shaft 20 to pawl subassembly 33. A threaded fastener 34 is positioned through an opening 36 in the front face of driver 14 and is configured to be mounted to a threaded opening 38 formed within head portion 22 of driver shaft 20. Fastener 34 fixedly mounts driver 14 to shaft 20; and, driver 14 and driver shaft 20 are held non-rotatable due to the keyed interface between non-circular head portion 22 and non-circular recess 24.

Figure 5:
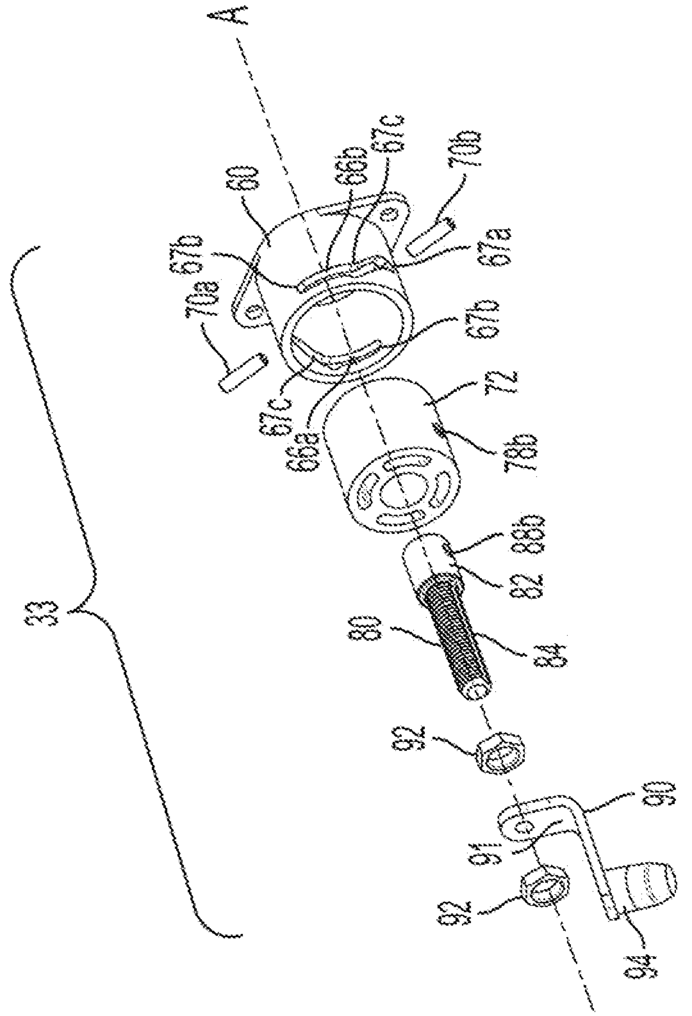
FIG. 5 is an exploded view of a pawl sub-assembly of the latch of FIG. 1A.

Referring now to pawl sub-assembly 33 of latch 10, which is shown on the right hand side of door 12 in FIG. 4 and in FIG. 5, pawl sub-assembly 33 includes a hollow cylindrical housing 60 that is fixedly and non-rotatably mounted to the rear side 12*b* of door 12 by fasteners 62. Housing 60 is shown in FIGS. 7A-7E. Housing 60 remains stationary during operation of latch 10. Specifically, housing 60 has shoulders or flanges 64 at its proximal end (i.e., door mounting end), and the shoulders or flanges 64 include holes 61 through which the fasteners 62 are positioned. Like fasteners 18, fasteners 62 may be self-tapping screws that are capable of piercing holes in door 12. Fasteners 62 can vary. A central hole 65 oriented with axis A is defined in the proximal end. In an assembled form of latch 10, connector 28 of driver shaft 20 is positioned through hole 65 of housing 60.

Two opposing ramps 66*a* and 66*b* (referred to either individually or collectively as ramp(s) 66) are positioned on opposite sides of the revolved side wall of housing 60. Ramps 66 are symmetrical (and mirror images) and spaced apart in a circumferential direction by 180 degrees. Each ramp 66 extends in a circumferential direction about the axis A. Each ramp 66 includes a proximal portion 67*a*, a distal portion 67*b*, and an intermediate portion 67*c* defined between portions 67*a* and 67*b*. As viewed in an axial direction, proximal portion 67*a* extends in the proximal direction (as compared to portions 67*b* and 67*c*). Portion 67*c* is a detent that is provided for pressure-reduction purposes, as will be described in greater detail later.

Each ramp 66 may pass through either all or a portion of the wall thickness of housing 60. Alternatively, each ramp 66 could be provided in the form of a projection. Ramps 66 may also be referred to as slots, guides or cams. Ramps 66 are sized to accommodate pins 70*a* and 70*b* (referred to either individually or collectively as pin(s) 70) in a form-fitting manner, as will be described in greater detail later.

A sleeve 72 in the form of a hollow cylindrical body is positioned within the hollow interior of housing 60. Sleeve 72 is depicted in FIGS. 8A-8D. A non-circular hole 74 is defined on the proximal end face of sleeve 72. Hole 74 is sized to accommodate connector 28 of driver shaft 20. Hole 74 and connector 28 are keyed to each other such that driver shaft 20 is non-rotatable with respect to sleeve 72. In other words, sleeve 72 rotates with driver shaft 20. A large diameter circular hole 76 is defined on the distal end face of sleeve 72. A circular head 82 of threaded shaft 80 is configured to be positioned within hole 76. Holes 74 and 76 are co-aligned with axis A. Holes 78*a* and 78*b* (referred to either individually or collectively as hole(s) 78) are defined transversely through sleeve 72 and intersect hole 76. Holes 78 are disposed 180 degrees apart about axis A. Pins 70*a* and 70*b* are friction or interference fit into holes 78*a* and 78*b*, respectively.

Threaded shaft 80 includes an elongated body having a circular and hollow head 82 at its proximal end, and a non-circular threaded distal end 84. Shaft 80 is also depicted in FIGS. 9A-9E. The non-circular threaded distal end 84 includes opposing flat portions 85. A circular blind hole 86 is formed in head 82 and is sized for receiving connector end 28 of driver shaft 20, as is shown in FIG. 3C. Holes 88*a* and 88*b* (referred to either individually or collectively as hole(s) 88) are defined transversely through head 82 and intersect hole 86. Holes 88 are disposed 180 degrees apart about axis A. Pins 70*a* and 70*b* are friction or interference fit into holes 88*a* and 88*b*, respectively, thereby captivating shaft 80 to sleeve 72. Shaft 80 and sleeve 72 may be combined into a single unitary component. To that end, shaft 80 and sleeve 72 may be referred to herein more generally as a shaft.

In summary, and as best depicted in FIG. 3C, pins 70*a* and 70*b* are positioned through holes 78*a* and 78*b* of sleeve 72 as well as holes 88*a* and 88*b* of shaft 80, respectively, thereby non-rotatably connecting shaft 80 and sleeve 72. Also, as noted above, sleeve 72 is non-rotatably connected to driver shaft 20, and driver shaft 20 is non-rotatably connected to driver 14. Accordingly, rotation of driver 14 results in rotation of threaded shaft 80 with respect to the stationary housing 60. The radially outward portion of pins 70*a* and 70*b* are positioned and travel within ramps 66*a* and 66*b*, respectively, of stationary housing 60.

It is conceivable that pins 70 could be mounted to the interior surface of housing 60, and ramps 66*a* and 66*b* could be disposed on sleeve 72 (assuming that shaft 80 and sleeve 72 are fixed together).

Figure 2B:
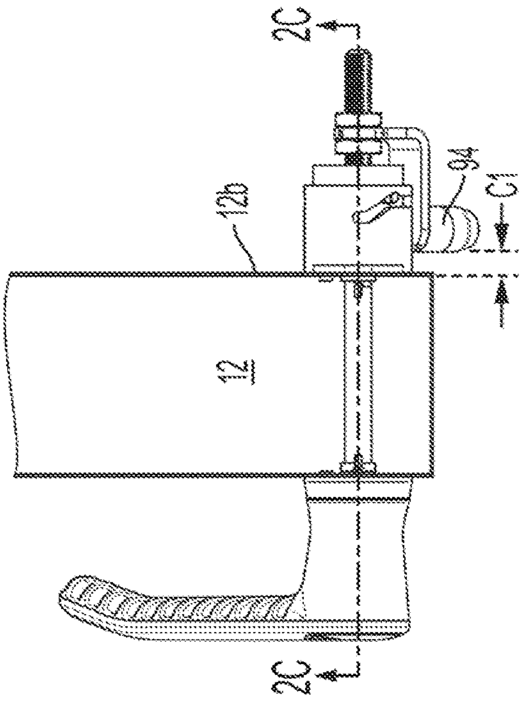
FIGS. 2A-2C depict isometric, top plan and cross-sectional views, respectively, of the door mounted latch of FIG. 1A, wherein the latch is shown rotated to a partially locked state.
Figure 2C:
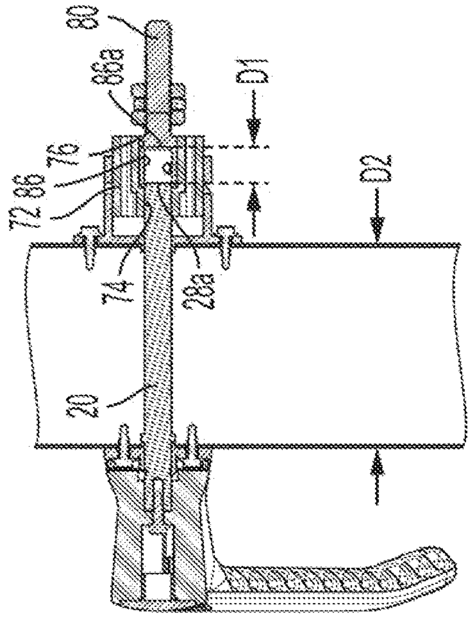

Referring now to FIG. 2C, door 12 may be a door for an HVAC unit, as noted above. HVAC unit doors, which are typically thick and filled with insulation, can have wide thickness tolerances. To accommodate for the thickness tolerance of the width D2 of door 12, a longitudinal gap having a dimension D1 is provided between the distal tip 28*a* of driver shaft 20 and the distal surface 86*a* of blind hole 86 (i.e., in an assembled form of latch 10). So long as driver shaft 20 remains rotationally keyed (i.e., non-rotatable) with sleeve 72, dimension D1 can vary without affecting operation of latch 10. For example, if door 12 were slightly wider than that which is shown, dimension D1 would be greater than that shown in FIG. 2C, however, driver shaft 20 would be rotationally keyed with sleeve 72 and operate as intended. Conversely, if door 12 were slightly narrower than that which is shown, dimension D1 would be less, however, driver shaft 20 would be rotationally keyed with sleeve 72 and latch 10 operate as intended. Thus, latch 10 can be considered modular because it compensates for the thickness tolerance of the door 12. Also, the length of driver shaft 20 may vary from that which is shown in order to accommodate door thicknesses outside of the above-described thickness tolerance.

Referring now to FIGS. 1C and 5, a pawl 90 is mounted to threaded distal end 84 of shaft 80 by two nuts 92. Pawl 90 includes an L-shaped bracket 91, and a roller cam 94 mounted to bracket 91 by a fastener 96. As is known in the art, roller cam 94 is configured to interact with a frame (not shown) to which door 12 is movably attached. In the closed and locked state of latch 10 shown in FIGS. 3A-3C, roller cam 94 as well as door 12 is compressed against the frame. And, in the unlocked state of latch 10 shown in FIGS. 1A-1C, roller cam 94 is detached from the frame.

Pawl 90, sleeve 72, shaft 80, pins 70 and roller cam 94 may together be considered as a pawl assembly or, more generally, as a pawl.

According to one method of operating latch 10, starting from FIGS. 1A-1C, latch 10 is initially positioned in an unlocked state, for example. Lock plug 40 in an unlocked state. In the unlocked state, driver 14 is rotated to a position where pawl 90 and its roller cam 94 do not register or interfere with the frame (not shown) such that door 12 can be moved to an open position with respect to the frame. In the unlocked state, pins 70 are positioned within distal portions 67*b* of respective ramps 66. When pins 70 are positioned within distal portions 67*b* of respective ramps 66, pawl 90 and its roller cam 94 are positioned far from the rear side 12*b* of door 12 such that a gap or distance C1 (FIG. 1C) is defined between the proximal side of roller cam 94 and the rear side 12*b* of door 12. Stated differently, at distance C1, pawl 90 is not compressed against the frame to which the door 12 is connected.

Figure 2A:
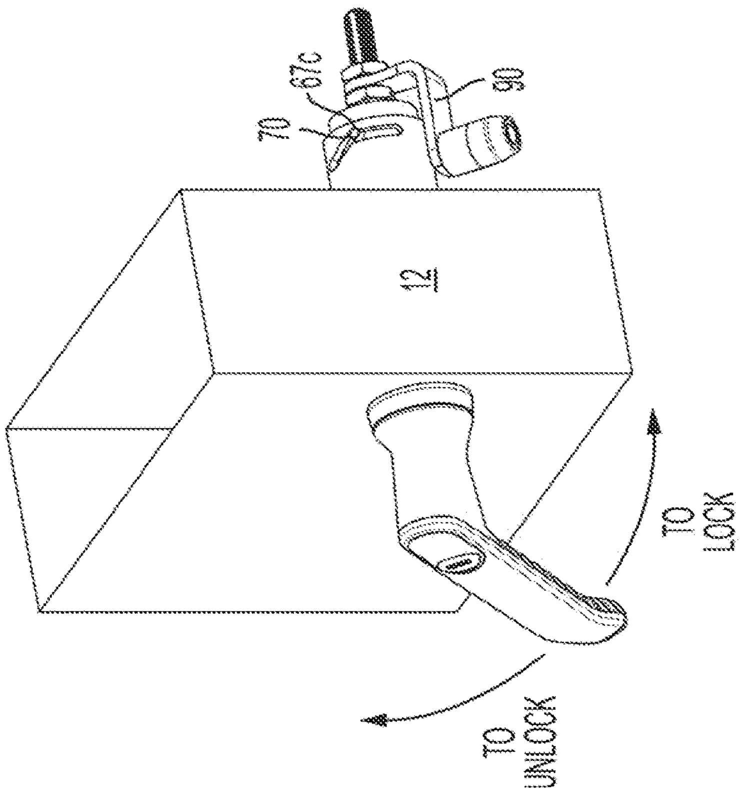

A user then moves latch 10 from the unlocked state to the partially unlocked/locked state shown in FIGS. 2A-2C. In the partially unlocked/locked state, driver 14 is rotated toward the locked state to a position where pawl 90 and its roller cam 94 register or interfere with the frame (not shown) such that door 12 cannot be moved to a fully open position. The door 12 can, however, be moved by distance C1 toward the open position until the proximal side of roller cam 94 contacts the frame.

Upon rotating driver 14 from the unlocked state to the partially unlocked/locked state shown in FIGS. 2A-2C, driver shaft 20, pins 70, sleeve 72 and pawl 90 rotate simultaneously along with driver 14 (due to the above-described non-rotatable connections) with respect to the stationary housing 60. As driver 14 is rotated, pins 70 slide within their respective ramps 66. Specifically, pins 70 slide from distal portions 67*b* to intermediate portions 67*c*. At this stage, rotation of driver does not yet cause translation of pawl 90 along axis A and toward rear side 12*b* of door 12. Thus, in the partially unlocked/locked state shown in FIGS. 2A-2C, the distance C1 is defined between the proximal side of roller cam 94 and the rear side 12*b* of door 12, and pawl 90 is not compressed against the frame to which the door 12 is connected.

Figure 3B:
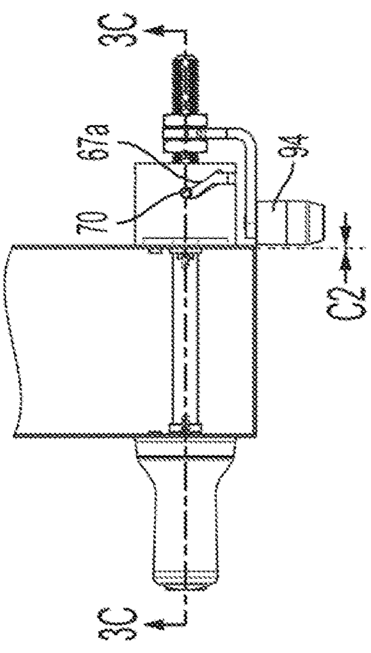
FIGS. 3A-3C depict isometric, top plan and cross-sectional views, respectively, of the door mounted latch of FIG. 1A, wherein the latch is shown rotated to a locked and compressed state.
Figure 3C:
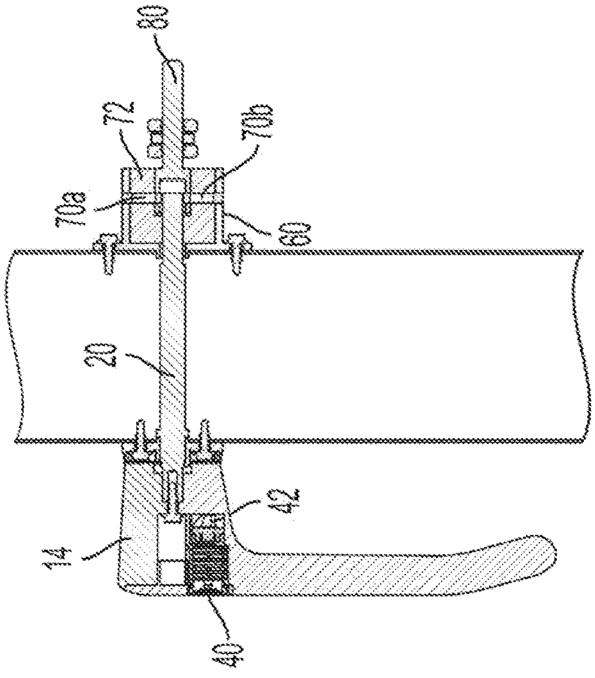
Figure 3A:
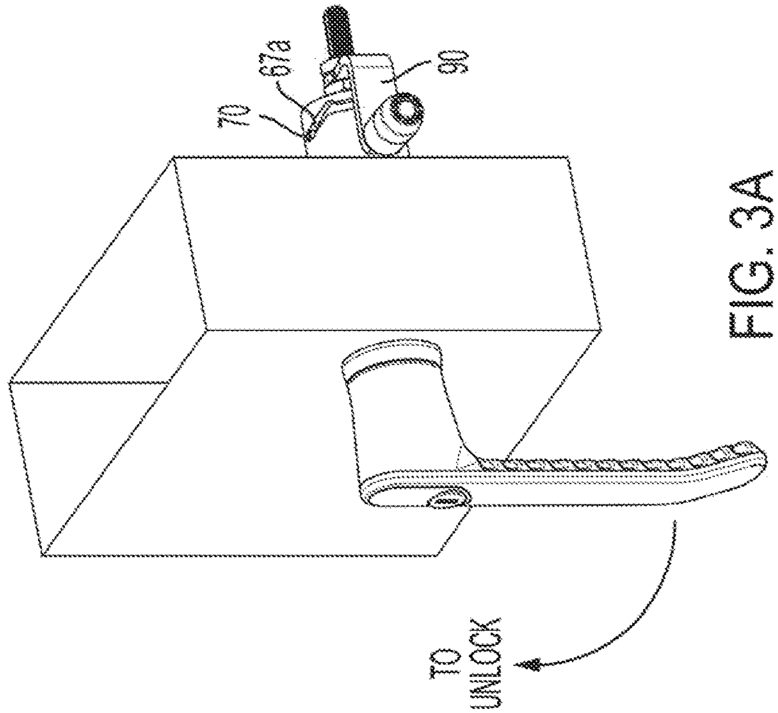

The user continues to rotate driver 14 in the same rotational direction to the locked state shown in FIGS. 3A-3C. Specifically, as driver 14 is rotated further, pins 70 slide from intermediate portions 67*c* to proximal portions 67*a* of their respective ramps 66. Moving pins 70 through proximal portions 67*a* causes pawl 90 to simultaneously rotate and translate toward rear side 12*b* of door 12. Specifically, the geometry of proximal portions 67*a* (which extend along the axis A in the proximal direction), as well as the pinned interface between housing 60, sleeve 72 and shaft 80, forces sleeve 72 and shaft 80 to move in a proximal direction toward rear side 12*b* of door 12. Once the pins 70 reach the terminal end of proximal portions 67*a*, latch 10 is maintained in a fully-compressed and locked state. At this stage, roller cam 94 registers with the door frame to prevent door 12 from being opened. Also, the distance C2 between the proximal side of roller cam 94 and the rear side 12*b* of door 12 may be zero, or, more generally, less than the distance C1. Stated differently, at distance C2, pawl 90 is compressed against the frame. In a fully-compressed state of the latch 10, any seal at the interface between door 12 and its frame (not shown) is also fully compressed.

If the user then rotates driver 14 in the opposite rotational direction (unlock direction) from the locked state shown in FIGS. 3A-3C to the partially unlocked/locked state shown in FIGS. 2A-2C, pins 70 move from proximal portions 67*a* to intermediate portions 67*c* of ramps 66. Consequently, pawl 90 rotates toward (but not too) the unlocked state and pawl 90 also translates in the distal direction (due to the geometry of proximal portions 67*a*). At this stage, the distance C1 is defined between the proximal side of roller cam 94 and the rear side 12*b* of door 12.

A detent or stop feature is defined at intermediate portions 67*c* signaling to the user (via tactile feel) that door 12 is partially unlocked at this stage and the compartment to which door 12 is attached may be de-pressurizing. The user may stop rotating driver 14 at this point. More particularly, if the compartment to which door 12 is attached is pressurized, then moving driver 14 to the partially unlocked/locked state shown in FIGS. 2A-2C will depressurize the compartment while preventing door 12 from suddenly moving to the fully open position as a result of the depressurization. Specifically, pawl 90 would contact the door frame of the compartment and prevent the door from fully opening while allowing door 12 to open by a limited distance (i.e., distance C1) for depressurization purposes. In the absence of intermediate portions 67*c,* unlocking latch 10 could result in door 12 rapidly and unexpectedly opening due to depressurization of the compartment.

The user then continues to rotate driver 14 in the opposite rotational direction (i.e., the unlock direction) from the partially unlocked/locked state shown in FIGS. 2A-2C to the unlocked state of FIGS. 1A-1C. Continuing to rotate driver 14 in the opposite rotational direction causes pins 70 to move from intermediate portions 67*c* to distal portions 67*b* of ramps 66. Consequently, pawl 90 rotates to the unlocked state shown in FIG. 1B, but pawl 90 does not translate along axis A any further from its position shown in FIG. 2B. Thus, the distance C1 is defined between the proximal side of roller cam 94 and the rear side 12*b* of door 12. The latch 10 is again in an unlocked state.

Figure 12A:
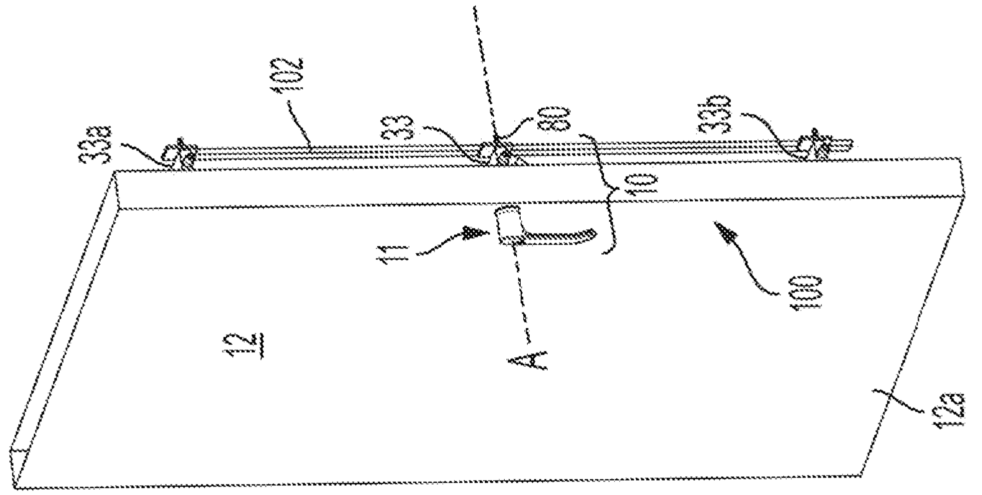
FIGS. 12A and 12B depict isometric views of a multi-point latch system for securing a door.
Figure 12B:
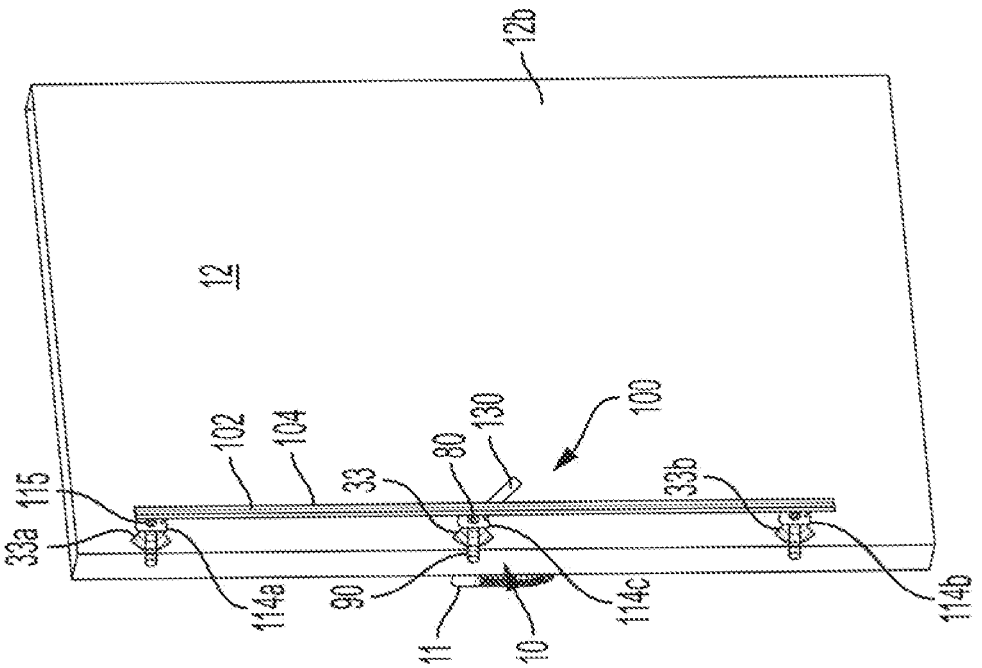

FIGS. 12A and 12B depict a multi-point latch 100 for securing door 12. Multi-point latch 100 comprises latch 10 (the same latch as described above) and two separate pawl sub-assemblies 33*a* and 33*b*. Pawl sub-assemblies 33*a* and 33*b* are connected to latch 10 by way of a linkage 102. Linkage 102 interconnects latch 10 to pawl sub-assemblies 33*a* and 33*b* such that pawl sub-assemblies 33*a* and 33*b* move synchronously with pawl sub-assembly 33 of latch 10. Accordingly, rotating latch 10 to the locked state causes pawl sub-assemblies 33*a* and 33*b* to also move to the locked state. And, rotating latch 10 to the unlocked state causes pawl sub-assemblies 33*a* and 33*b* to move to the unlocked state.

It should be understood that pawl sub-assemblies 33*a* and 33*b* are mounted to door 12 in the same manner as pawl sub-assembly 33 of latch 10. Pawl sub-assemblies 33*a* and 33*b* are not directly connected to a driver sub-assembly 11. Instead, pawl sub-assemblies 33*a* and 33*b* are indirectly connected to driver sub-assembly 11 of latch 10 via linkage 102. It can be appreciated that pawl sub-assembly 33 may be used independently and without driver sub-assembly 11 directly mounted thereto.

Pawl sub-assemblies 33*a* and 33*b* are structurally and functionally equivalent to pawl sub-assembly 33 of latch 10, thus, pawl sub-assemblies 33 are a modular feature of latch 10 that can be used together to perform a latching operation.

Figure 13B:
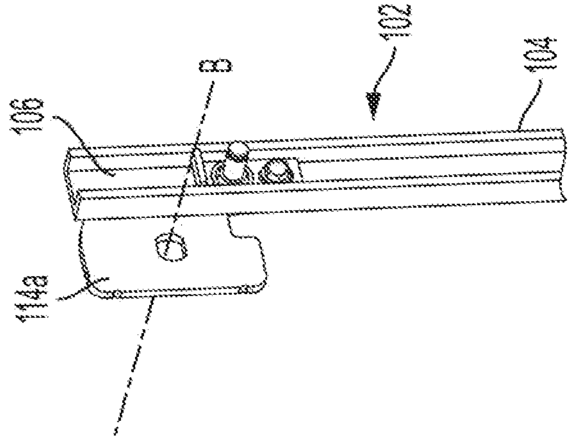
FIGS. 13A and 13B depict exploded and assembled views of a top portion of a linkage of the multi-point latch system of FIG. 12A.
Figure 13A:
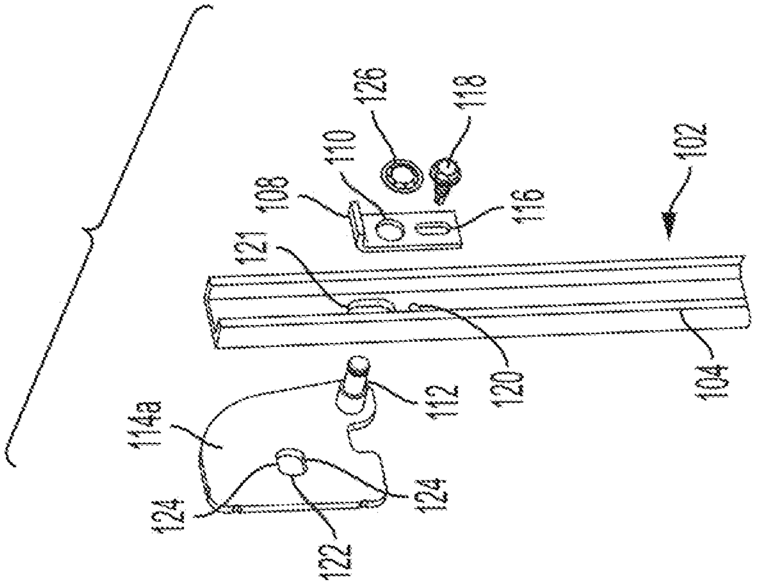
Figure 14A:
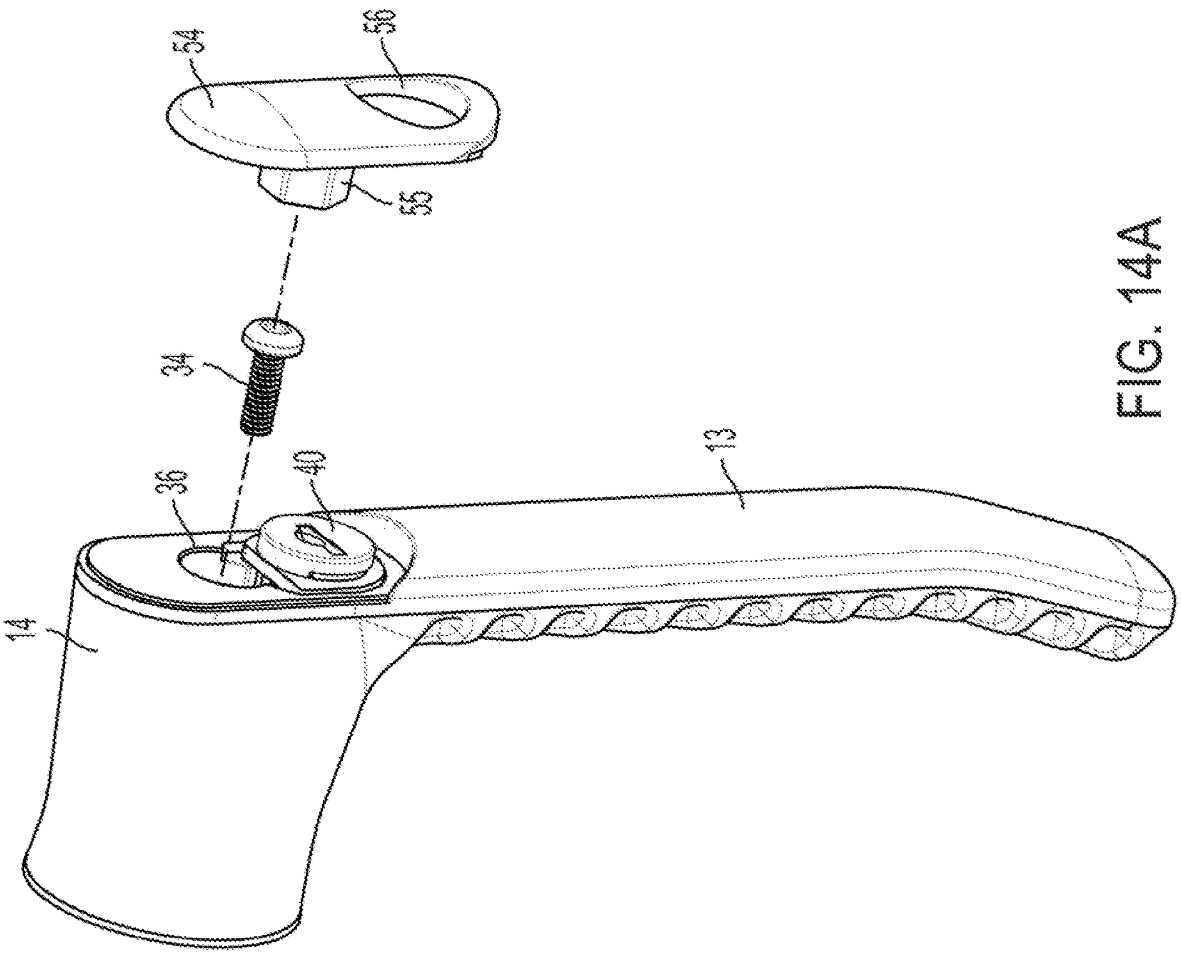
FIG. 14A is an exploded view of the driver of the latch of FIG. 1A.
Figure 14E:
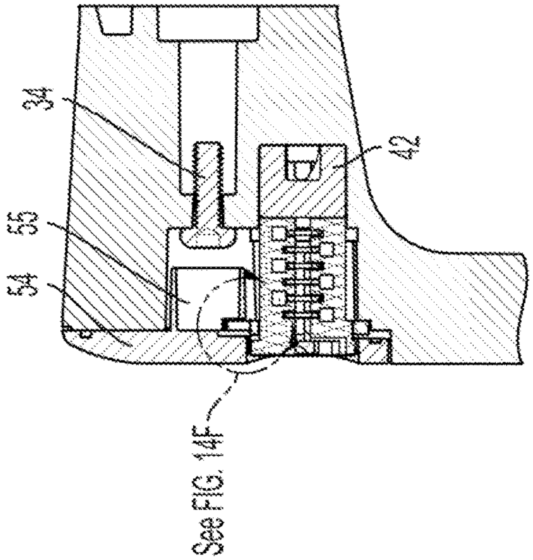
FIGS. 14B-14F show views of the driver of the latch of FIG. 1A in an unlocked state.
Figure 14F:
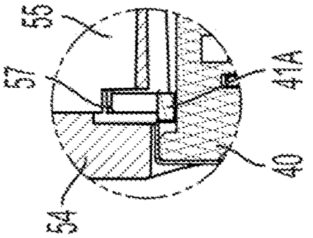
Figure 14D:
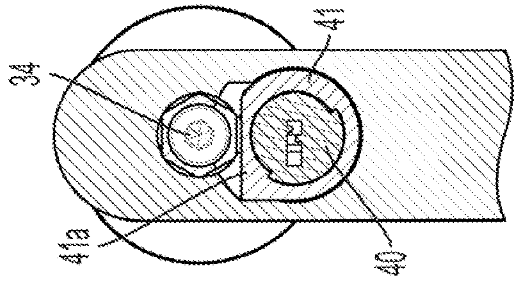
Figure 14C:
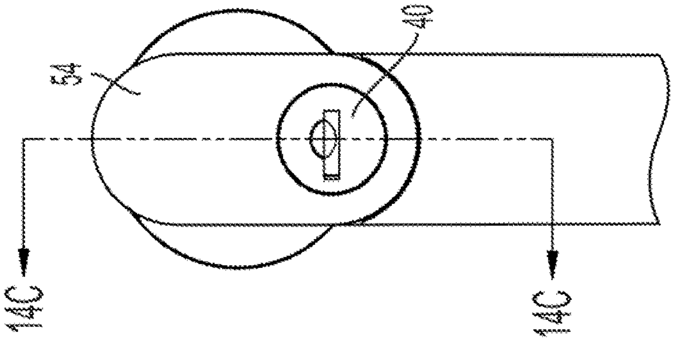
Figure 14B:
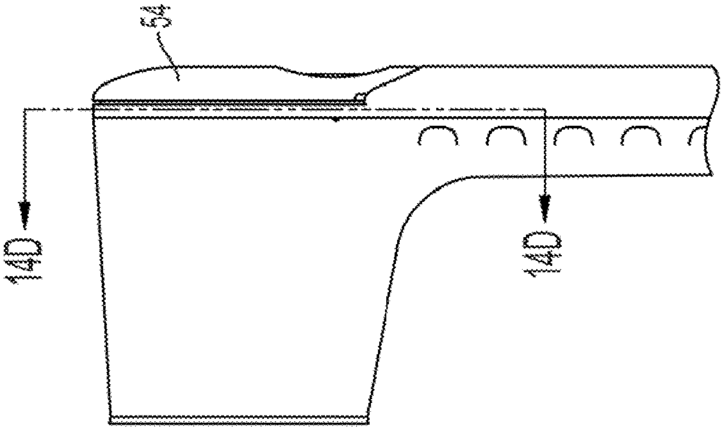
Figure 14J:
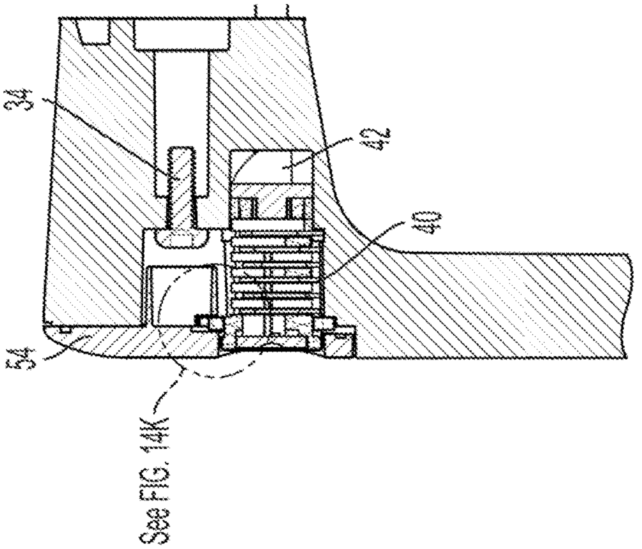
FIGS. 14G-14K show views of the driver in a locked state.
Figure 14K:
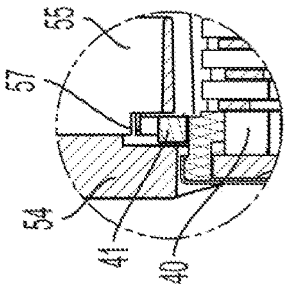
Figure 14I:
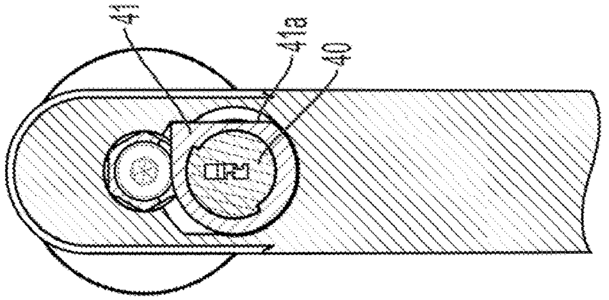
Figure 14H:
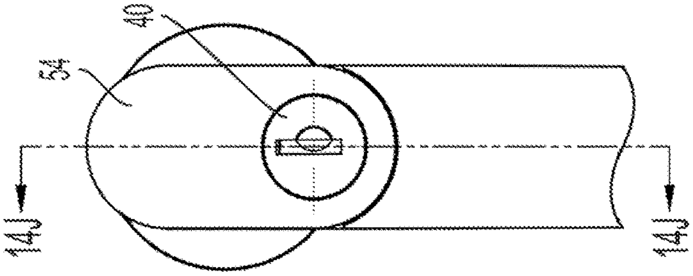
Figure 14G:
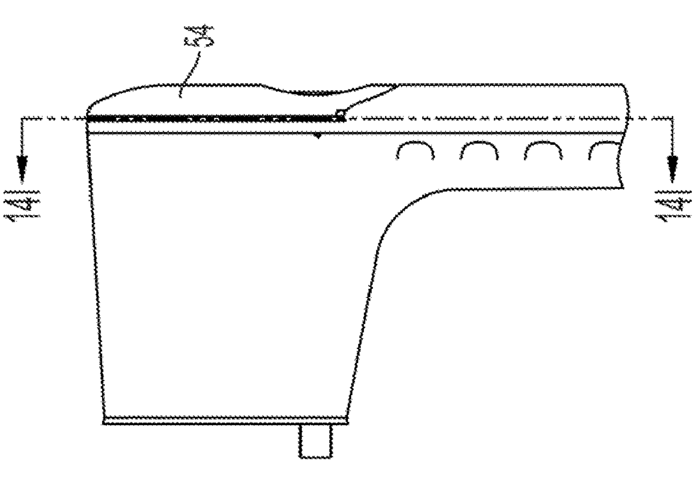

FIGS. 13A and 13B depict one mounting point on the top portion of linkage 102 of multi-point latch 100. Linkage 102 comprises a rod 104 having a groove 106 formed therein and a series of holes defined through the thickness of rod 104 that intersect groove 106. A hole 120 and an elongated slot 121 are formed through rod 104. An L-shaped clip 108 is positioned at the top end of groove 106. Clip 108 includes a first hole 110 for receiving a pin 112 extending from a cam 114*a* and a second hole or slot 116 through which a fastener 118 passes through for mounting to a threaded hole 120 in rod 104. Groove 106 and fastener 118 together prevent clip 108 from rotating or translating with respect to rod 104.

Cam 114*a* includes a pin 112, as described above, as well as a non-circular hole 122 having two opposing flat portions 124. An axis of rotation B of cam 144*a* passes through hole 122. Hole 122 is configured to receive non-circular threaded distal end 84 of shaft 80 in a tight form fitting manner. One or more fasteners 115, such as hex nuts, are employed to fixedly connect cam 114*a* to threaded distal end 84. By virtue of the non-circular connection between cam 114*a* and shaft 80, those components are non-rotatable with respect to each other (i.e., they rotate together). Pin 112 is positioned through slot 121 and hole 110 and is connected to a clip 126. Clip 126 connects the free end of pin 112 to L-shaped clip 108 and prevents the free end of pin 112 from disengaging from clip 108. Cam 114*a* can rotate with respect to rod 104.

Cam 114*a* is mounted to shaft 80 that is associated with pawl sub-assembly 33*a.* A second cam 114*b* is mounted to the bottom end of rod 104 using a clip 108 in the same manner as cam 114*a.* Cam 114*b* is mounted to shaft 80 that is associated with pawl sub-assembly 33*b.* A third cam 114*c* is mounted to the longitudinal center of rod 104 in the same manner as cams 114*a* and 114*b*. Cam 114*c* is mounted to shaft 80 that is associated with pawl sub-assembly 33 of latch 10. Cams 114*a*-114*c* are structurally and functionally equivalent and operate in the same manner.

Hole 120 and elongated slot 121 are associated with cam 114*a,* and, although not shown, it should be understood that, another hole 120 and slot 121 are associated with cam 114*b,* and yet another hole 120 and slot 121 are associated with cam 114*c.* Elongated slots 121 and 116 together accommodate for variances in the vertical length and position of the various components of linkage 102 as well as the pawl sub-assemblies 33 to which linkage 102 is connected. While it is possible, it is not intended to have a vertical adjustment at cam 114*c,* which is the driving location, because there exists a tight diametrical fit between the rod 104 and pin 112 at cam 114*c*. Adjustment due to tolerance issues may only be required at the remote latches of pawl sub-assemblies 33*a* and 33*b.*

In operation, rotating driver 14 of latch 10 causes pawl 90 of pawl sub-assembly 33 to move between the locked and unlocked states, as was described in detail above. Shaft 80 moves with pawl 90, as was described above. Rotation and translation of shaft 80 of latch 10 (as described above) also causes simultaneous rotation of cam 114*c* about axis A as well as resultant translation of cam 114*c* along axis A. Rotation and translation of cam 114*c* causes simultaneous rotation of rod 104 about axis A as well as resultant translation of rod 104 along axis A. Rotation and translation of rod 104 causes simultaneous rotation of cams 114*a* and 114*b* about their respective axes B as well as resultant translation of cams 114*a* and 114*b* along their axes B. Rotation and translation of cams 114*a* and 114*b* causes simultaneous rotation of shafts 80 and pawls 90 of pawl subassemblies 33*a* and 33*b* about their respective axes B as well as resultant translation of shafts 80 and pawls 90 of pawl subassemblies 33_a_ and 33_b_ along respective axes B. Accordingly, in summary, rotation and translation of shaft 80 of latch 10 causes simultaneous rotation and translation of three separate pawls 90, i.e., pawls 90 of pawl subassemblies 33, 33_a_ and 33_b_. Each pawl 90 provides a separate point of contact for latching door 12 in a closed and locked state.

A handle 130 is either connected to or extends from cam 114_c_. Alternatively, handle 130 extends from pawl 90 of latch 10. Handle 130 is non-rotatably connected to shaft 80. Multi-point latch 100 can be operated using handle 130 in the same manner as described above with respect to driver 14. In other words, rotation of handle 130 causes rotation and translation of three pawls 90 between locked and unlocked states. Handle 130 is provided on the rear side 12_b_ of door 12 to prevent a user from inadvertently being locked inside of a compartment, such as a freezer or refrigerated compartment.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A compression latch for a door comprising:

a driver that is rotatable with respect to the door between an unlocked position and a locked position, said driver being configured to be mounted to one side of the door, a driver shaft that is non-rotatably connected to the driver such that said driver shaft rotates along with said driver in the same direction, the driver shaft having a proximal end non-rotatably positioned within a recess formed in the driver, and a pawl assembly that is configured to be mounted to an opposite side of the door, said pawl assembly comprising (i) a housing that is configured to be fixedly mounted to the door, and (ii) a pawl that is movably connected to the housing and is configured to both rotate and translate with respect to the housing in response to rotation of the driver shaft, wherein, in an unlocked position of the driver, the pawl is positioned to permit opening of the door, and, in a locked position of the driver, the pawl is positioned to prevent opening of the door, and wherein the compression latch is configured to translate the pawl closer toward the door upon rotating the driver from the unlocked position to the locked position wherein the driver shaft includes a distal end that is non-rotatably connected to said pawl.

2. The compression latch of claim 1, wherein the pawl is fixedly connected to a shaft of the pawl assembly, and the shaft of the pawl assembly is non-rotatably connected to the driver shaft.

3. The compression latch of claim 2, wherein the shaft of the pawl assembly includes a threaded shaft that is configured to be connected to the pawl, and a sleeve that is non-rotatably connected to the threaded shaft as well as the driver shaft.

4. The compression latch of claim 2, wherein the shaft of the pawl assembly is configured to translate with respect to the driver shaft.

5. The compression latch of claim 2, wherein a pin associated with one of the shaft of the pawl assembly and the housing is engaged with a ramp disposed on the other of the shaft and the housing, such that motion of the pin along the ramp results in rotation and translation of the shaft and the pawl that is connected to the shaft.

6. The compression latch of claim 5, wherein the ramp is defined on the housing and the pin extends from the shaft.

7. The compression latch of claim 5, wherein the ramp includes a detent that is defined between two terminal ends of the ramp, wherein the detent defines an intermediate fixed position for the pin between the two terminal ends of the ramp, and wherein when the pin is positioned in the detent, the door is permitted to open by a limited distance.

8. The compression latch of claim 5, wherein the ramp extends in a direction along the housing that has a circumferential component as well as an axial component.

9. The compression latch of claim 1, said pawl comprising a hole for receiving the driver shaft, wherein the hole and the driver shaft are sized to accommodate a dimensional tolerance in a thickness dimension of the door.

10. The compression latch of claim 1, wherein the recess in the driver and the distal end of the driver shaft are non-circular.

11. The compression latch of claim 1, wherein the distal end of the driver shaft is cylindrical and includes at least two flat portions.

12. The compression latch of claim 1, wherein a cylindrical shaft portion extends between the proximal end of the driver shaft and distal end of the driver shaft.

13. The compression latch of claim 1, wherein the pawl is configured to rotate about an axis and translate along the axis.

14. A multi-point latch system comprising the compression latch of claim 1 and a plurality of said pawl assemblies.

15. The multi-point latch system of claim 14 further comprising cams each connected to a pawl of a respective one of the plurality of pawl assemblies, said cams each connected to a common rod, wherein movement of the pawl of the compression latch causes simultaneous movement of the rod and the pawls of the plurality of pawl assemblies.

16. The multi-point latch system of claim 15, wherein the common rod is connected either directly or indirectly to the pawl of the compression latch.

17. A door assembly comprising the door and the compression latch of claim 1.

* * * * *